US009391475B2

(12) United States Patent
Mayer et al.

(10) Patent No.: US 9,391,475 B2
(45) Date of Patent: Jul. 12, 2016

(54) DEVICE AND METHOD FOR CONNECTING AN ENERGY-CONVERTING TERMINAL

(75) Inventors: Klaus-Michael Mayer, Ditzingen (DE); Friedrich Schoepf, Sternenfels-Diefenbach (DE); Markus Brandstetter, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 797 days.

(21) Appl. No.: 13/576,591

(22) PCT Filed: Dec. 20, 2010

(86) PCT No.: PCT/EP2010/070175
§ 371 (c)(1),
(2), (4) Date: Oct. 16, 2012

(87) PCT Pub. No.: WO2011/091910
PCT Pub. Date: Aug. 4, 2011

(65) Prior Publication Data
US 2013/0026821 A1    Jan. 31, 2013

(30) Foreign Application Priority Data
Feb. 1, 2010   (DE) .................. 10 2010 001 445

(51) Int. Cl.
*H04B 3/54*        (2006.01)
*H02J 13/00*       (2006.01)

(52) U.S. Cl.
CPC ........... *H02J 13/002* (2013.01); *Y02E 60/7815* (2013.01); *Y04S 40/121* (2013.01)

(58) Field of Classification Search
CPC .................................................. Y04S 40/121
USPC ........................................... 307/1–8
See application file for complete search history.

(56) References Cited

U.S. PATENT DOCUMENTS 6,005,476 A * 12/1999 Valiulis .............. G08B 13/1418
                                                340/12.32
6,731,201 B1 * 5/2004 Bailey ..................... H04B 3/54
                                                340/12.32

(Continued)

FOREIGN PATENT DOCUMENTS

CN       101636847       1/2010
EP       0 904 729       3/1999

(Continued)

OTHER PUBLICATIONS

International Search Report, PCT International Application No. PCT/EP2010/070175, dated Sep. 21, 2011.

*Primary Examiner* — Jared Fureman
*Assistant Examiner* — Emmanuel R Dominique
(74) *Attorney, Agent, or Firm* — Norton Rose Fulbright US LLP

(57) ABSTRACT

A device for connecting an energy-converting terminal to an electric power supply network and for exchanging data via the power supply network, a network connection for connecting to the power supply network, a communications unit for receiving and sending data over the power supply network, a logic unit for controlling the data exchange and for controlling or regulating the power of the energy-converting terminal, sensors and an associated signal processing unit for monitoring the energy-converting terminal, as well as a power section for controlling the energy flow to the energy-converting terminal are provided. The network connection, the communications unit, the logic unit, a sensor unit having sensors and the signal processing unit associated with the sensors and the power section are combined in an application-specific integrated circuit (ASIC). A corresponding method is also described.

12 Claims, 1 Drawing Sheet

(56) References Cited

U.S. PATENT DOCUMENTS

| | | | |
|---|---|---|---|
| 7,203,855 B2* | 4/2007 | Chou | G06F 1/3203 365/227 |
| 7,253,732 B2* | 8/2007 | Osann, Jr. | G06Q 50/06 340/539.16 |
| 2001/0025349 A1* | 9/2001 | Sharood | G06Q 30/0235 713/340 |
| 2002/0080010 A1* | 6/2002 | Zhang | H04B 3/542 375/257 |
| 2004/0133116 A1 | 7/2004 | Abraham-Fuchs et al. | |
| 2005/0035729 A1* | 2/2005 | Lev | H05B 37/0263 315/291 |
| 2005/0184867 A1* | 8/2005 | Osann | G06Q 50/06 340/539.25 |
| 2009/0120212 A1 | 5/2009 | Hargrove et al. | |
| 2009/0177580 A1 | 7/2009 | Lowenthal et al. | |

FOREIGN PATENT DOCUMENTS

| | | |
|---|---|---|
| EP | 1 398 485 | 3/2004 |
| FR | 2 920 475 | 3/2009 |
| JP | 6-224246 | 8/1994 |
| JP | 2008-182851 | 8/2008 |
| JP | 2009-71723 | 4/2009 |
| JP | 2009-130585 | 6/2009 |
| JP | 2010011704 | 1/2010 |
| WO | WO 2006/114766 | 11/2006 |
| WO | WO 2008/125915 | 10/2008 |
| WO | WO 2008/132553 | 11/2008 |

* cited by examiner

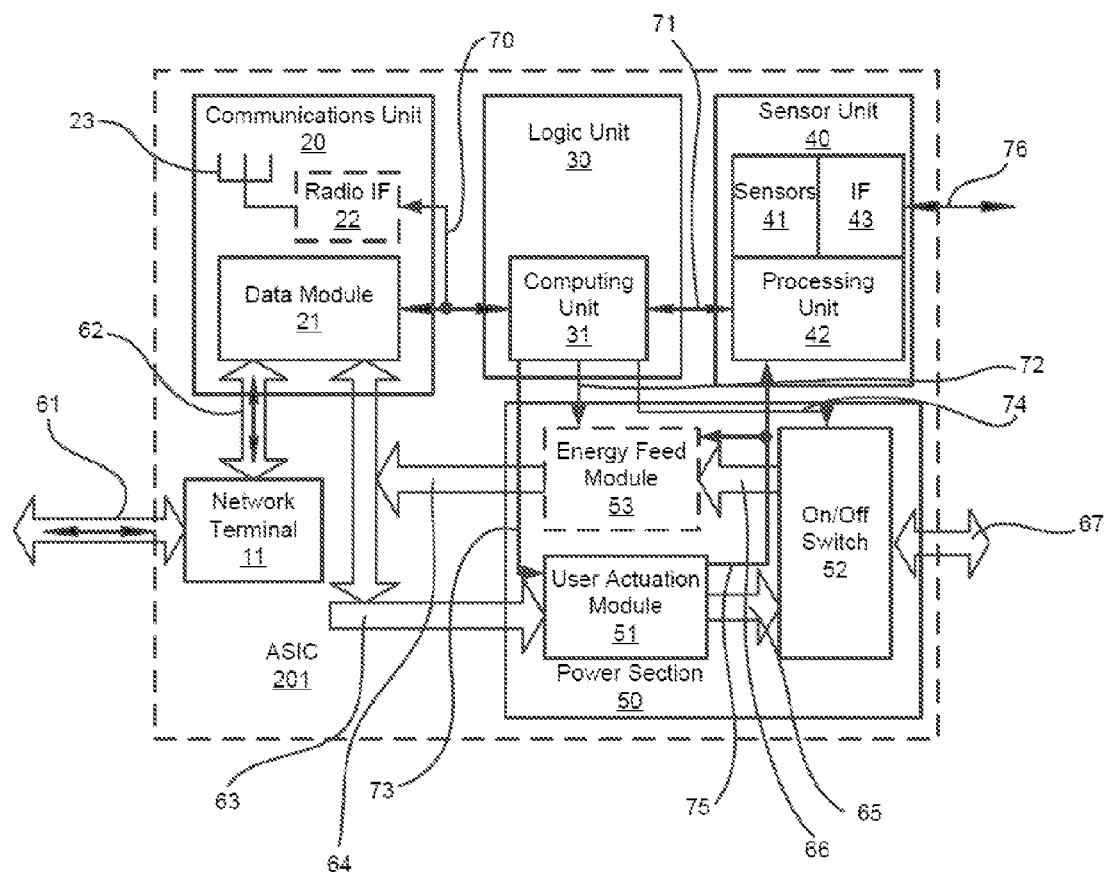

DEVICE AND METHOD FOR CONNECTING AN ENERGY-CONVERTING TERMINAL

FIELD OF THE INVENTION

The present invention relates to a device for connecting an energy-converting terminal to an electric power supply network and for exchanging data via the power supply network, a network connection for connecting to the power supply network, a communication unit for receiving and sending data over the power supply network, a logic unit for controlling the data exchange and for controlling or regulating the power of the energy-converting terminal, sensors and an associated signal processing unit for monitoring the energy-converting terminal, as well as a power section for controlling the energy flow to the energy-converting terminal are provided.

The present invention also relates to a method for operating an energy-converting terminal on an electric power supply network, for exchanging data over the power supply network and for controlling or regulating the energy-converting terminal as a function of the exchanged data and of sensor data.

BACKGROUND INFORMATION

In order to improve the efficiency in the use of electric energy, active regulation is increasingly used during the energy generation and also for energy-consuming units. To do this, design approaches are used in building control and instrumentation technology in which central controls and regulations communicate with the terminals via proprietary communications standards. Sensors and actuators are wired to one another via field bus structures, their mutual association being programmed centrally. A self-sufficient logging on of units in the power supply network is neither provided nor possible. The control algorithms run centrally and thus load up the data traffic; for rapid regulations, secure communications design approaches operating in real time, such as "secure profibus" or "interbus" have to be used.

Generally, assemblies such as frequency converters, sensors, phase angle control and power switches as well as communications assemblies are separately attached to the units that are to be regulated or are provided at separate measuring locations. This construction from different components severely restricts the diagnostic capability of the system, since no simply describable setpoint state is known, from which deviations could be simply established.

Current integrated design approaches, such as a a motor actuation for brushless motors in household devices, utilize multi-chip modules of the FSB50250 from the firm of Fairchild. In this case, however, neither a sensor system nor logic is provided. The "Internet of Things", of the Massachusetts Institute of Technology, on the other hand, equips each terminal with local intelligence, and enables a self-organization, for instance of home appliances, security monitoring and energy sources. However, according to the current status, this presupposes costly electronics on the terminal, which generally cannot be accommodated in the present designs of the units.

The currently conventional design approaches, such as "Digital Current" cover only a part of the integration, and in addition are limited to a switching power of about 60 Watt.

An implementation of designs having "local intelligence" present at the location of the energy consumer or the energy generator would be favored by cost-effective, standardized design approaches having a small physical size.

In the conventional devices, it is a disadvantage that the design approaches are composed of a plurality of components, and therefore occupy a relatively large physical volume and require a not inconsiderable installation expenditure.

It is an object of the present invention to provide a device and a method which enable a cost-effective and space-saving connection of energy-converting terminals and a data network carried over a power line.

SUMMARY

In accordance with the present invention, the network connection, the communications unit, the logic unit, a sensor unit having sensors and the signal processing unit associated with the sensors and the power section are combined in an application-specific integrated circuit (ASIC). The integrated circuit enables the operation of energy-converting electric terminals within an environment connected via a data network. The data transmission of the various participants in the data network takes place, in this instance, via the lines of the power supply network, which clearly reduces the installation expenditure compared to the design of a separate data network. The data exchange makes possible the communication of the network participants among one another and, for example, with centrally controlled units and energy managers. The device, in this instance, represents the integration of the functions communication, intelligence, power electronics, sensor system and stand-alone control algorithms in one integrated module, executed as an ASIC. This integrated circuit may be used for a plurality of fields of application, for instance, for a gentle startup of electric motor users for the operation of pumps during the simultaneous recording of temperature data, in household units as well as in additional industrial and commercial units, which increasingly require local intelligence for energy savings and for communication, such as for diagnostics and maintenance. The combination of the functions into one application-specific integrated circuit makes possible the spreading of the technology in large piece numbers at low component costs and installation costs, as well as at the lowest possible space requirement in the respective energy-converting terminal. Because, in the energy-converting terminal, its own intelligence is provided, it is also possible to provide frequency converters of increased switching power, in which the auxiliary inductance of the motors is used, since then the increased computing expenditure, control expenditure and evaluation expenditure is able to be realized, without a data traffic having a central control and regulation device being required, which would strain the entire system.

The intelligence required for the data exchange and controlling or regulating various energy-converting terminals is able to be provided in that the logic unit has a computing unit at least for the regulation, control and diagnosis of the energy-converting terminal, for processing sensor data, for processing specification and control data received from the power supply network via the communications unit, and for sending log-in data and status data to the power supply network via the communications unit. In this context, the computing unit takes over the processing of the local regulating, diagnostic and control tasks while taking into account the present sensor data. It picks up the specifications and control commands from the data network and communicates, in reverse, status data, log-ins, sensor data, alarms or additional relevant events to the energy management or other network participants.

According to one particularly preferred embodiment variant of the present invention, it may be provided that the sensor unit has integrated sensors for determining acceleration, position, temperature, current and/or voltage and/or that the sensor unit has an interface for picking up external sensor data, and that the sensor unit has a signal processing unit for the signals supplied by the sensors. Because of the integration of the sensors into the application-specific integrated circuit, sensor functions required for many applications are able to be provided in a cost-effective manner. The interface enables the connection of additional, optional, external sensors. The signal processing of the integrated and external sensors is able to take place by the integrated signal processing, in this instance.

The power section includes a user actuation module, an on/off switch and/or an energy feeding module, and thus the power section is able to take over both the energy supply to the energy-converting terminal via the user actuating module and the on/off switch and also optionally via the energy feeding module for energy-generating terminals the regenerative control of energy from the energy-converting terminal into the power supply network. In the user actuating model, in this instance, various actuating variants, for instance, a frequency converter or a phase angle control may be implemented. Because of that, the connected energy-converting terminal is able to be controlled in its power both centrally via the data network and locally in the optimization rules running in the logic unit.

The external data exchange with additional network users takes place over the electric power supply network. Therefore, it may be provided that the communications unit has a data module for coupling in data and for coupling out data from the power supply network and/or that the communications unit has a radio interface. The data exchange via the power supply network is able to take place via conventional communications standards that are suitable for Powerline, for instance, via TCP/IP. For this, the data module separates the communications current from the energy current and guides it to the subsequent logic module. Furthermore, the data module picks up data from the logic module and distributes these via the energy-converting terminal. The radio interface provided, for instance, optionally makes possible the communication with actuators or sensors which are not connected to the energy-converting terminal. In the process, the radio interface takes over an additional gateway function. Radio standards are preferably provided for the radio interface, which support the power supply from the radio waves themselves or also support necessary localization services, which may then also be evaluated locally.

The energy flow from the power supply network to the energy-converting terminal, as well as the data flow between the various integrated modules within the application-specific integrated circuit, is able to be made possible in that the network connection and the communications unit, as well as the communications unit and the power section, are connected via power supply lines, and that the logic unit is connected to the communications unit, the power section and the sensor unit, and that the sensor unit is connected to the power section via the data lines.

Corresponding to one preferred specific embodiment of the present invention, it may be provided that the application-specific integrated circuit (ASIC) is executed as a transfer molded module. This embodiment known as a System-m-Package assures in a cost-effective manner the compactness, robustness with respect to weather influences and mechanical influences, electrical insulation and the removal of heat losses.

An object of the present invention relating to the method is attained in that, in an application-specific integrated circuit (ASIC) that is provided between the power supply network and the energy-converting terminal, data from the power supply network connected via an integrated network connection are coupled out by an integrated communications unit, and that data are coupled into the power supply network, that the data exchanged via the power supply network are set up or processed by an integrated logic unit, that the integrated logic unit receives and evaluates sensor data from an integrated sensor unit having integrated sensors and an integrated signal processing unit, and that the integrated logic unit controls or regulates the user control of the connected energy-converting terminal via an integrated power section as a function of the data exchanged via the power supply network and the sensor data received. The method enables the operation of different energy-converting terminals, such as pumps, home appliances, electric motor users or additional industrial and commercial units within the scope of a data network (Powerline) brought together via the power supply network. In this context, control and regulating tasks are able to be carried out both locally at the terminal or via centrally controlling units or energy managers. The data exchange, the control or regulation of the power supply to the terminal and the recording of operating data via sensors takes place in the application-specific integrated circuit, in this instance, and is consequently cost-effective and implementable in large piece numbers.

BRIEF DESCRIPTION OF THE DRAWING

The present invention is explained in more detail below with reference to an exemplary embodiment depicted in the FIGURE.

FIG. 1 shows an integrated circuit (ASIC) in a schematic representation.

DETAILED DESCRIPTION OF EXAMPLE EMBODIMENTS

Integrated circuit 10 (ASIC) is used for the connection of an energy-converting terminal (not shown) to an electric power supply network 61 and for the exchange of data via power supply network 61.

Integrated circuit 10 includes a network terminal 11, a communications unit 20, a logic unit 30, a sensor unit 40 and a power section 50.

The communications unit is constructed from a data module 21 and a radio interface 22 having a connected integrated antenna 23. Radio interface 22 and connected integrated antenna 23, in this instance, are components to be provided optionally.

Logic unit 30 includes a computing unit 31 in the form of a μ-controller.

In sensor unit 40, integrated sensors 41, a signal processing unit 42 and an interface 43 are integrated for connection of external sensors that are not shown.

Power section 50 includes a user actuation module 51, an on/off switch 52 as well as an energy feed module 53. Energy feed module 53 is provided optionally.

The network terminal 11 is connected to the power supply network 61. In this context, the connection may take place in a single-phase or a three-phase manner. On the output side, network terminal 11 is connected to data module 21 of communication unit 20 via an energy/data connection 62. Both power supply network 61 and energy/data connection 62 are provided as Powerline connection for the energy transport and the data transport.

Logic unit 30 is connected via a first data line 70 to communications unit 20, using a second data line 71 to sensor unit 40 and using a third, fourth and fifth data line 72, 73, 74 to power section 50. In this instance, third data line 72 connects energy feed module 53, fourth data line 73 connects user actuating module 51 and fifth data line 74 connects on/off switch 52 to logic unit 30. Energy feed module 53 and user actuating module 51 are connected to sensor unit 40 via a sixth data line 75. Sensor unit 40 is connected via a signal line 76 to optional external sensors that are not shown.

An energy-converting terminal (not shown) is connected to on/off switch 52 of power section 50 via a terminal connection 67. The energy flow to the energy-converting terminal takes place within power section 50 via a second energy line 65 from user actuating module 51 to on/off switch 52. If an energy-generating terminal is connected to terminal connection 67, the energy flow takes place via a second feedback line 66 from on/off switch 52 to energy feed module 53.

Electric energy is picked up via network terminal 11 from power supply network 61 or, in the case of an energy-generating terminal (generator), is fed into power supply network 61. At the same time, there takes place over network terminal 11 a bidirectional communication via power supply network 61 via Powerline communications standards. This makes possible a data exchange using controlling central units or energy managers as well as using additional energy-converting terminals which are also equipped with such an integrated circuit 10 for the exchange of data.

Communication module 20 takes over the communications processing via Powerline communications standards, for instance, for the TCP-IP protocol provided for Internet applications. Data module 21, included in communications module 20, separates the communications current from the data current and guides it to subsequent logic unit 30, or picks up data from logic unit 30 and distributes them via power supply network 61. Radio interface 22 is an optional supplementation, in order, for instance, to be able to communicate with additional distributed actuators and sensors, that are not connected to power supply network 61. Thus it takes on the function of an additional gateway. A preferred type of radio interface 22 are radio standards which support the power supply from the radio waves themselves as well as supporting necessary localization services, which may then be evaluated locally.

Logic unit 30, having integrated computing unit 31, takes over processing the local regulating, diagnostic and control tasks. It picks up the specifications and controls from power supply network 61 and communicates in the opposite direction status data, log-ins, sensor data, alarms and other events via communications unit 20, network terminal 11 and power supply network 61 to the energy management or other multi-value services or other network users.

Sensor unit 40 supplies logic unit 30 with measured data of the embedded, integrated sensors 41 and optionally offers an interface 43 for external sensors which, for example, are provided in the energy-converting terminal. The signals of integrated sensors 41 as well as of the external sensors are processed in signal processing unit 42.

Power section 50, in the specific embodiment shown, makes possible the connection of an energy-using terminal as well as the connection of an energy-generating terminal. Because of user actuating module 51, the connected energy-converting terminal is controlled in its performance. Besides a simple on and off switching function, in this context, additional actuating functions, such as a generalized phase angle control or generalized phase control may be provided. If an energy-generating terminal is connected as the energy-converting terminal, energy feed module 53 takes over the feedback of the energy into power supply network 61. In this context, in energy feed module 53, the conversion of small energy quantities is able to take place as a function of the power limits. Power section 50 thus enables the connection of photovoltaic modules as energy-converting terminals to power supply network 61. On/off switch 52 assures the switching on and off the power current both in the power case and in the generating case.

The functional blocks network terminal 11, communications unit 20, logic unit 30, sensor unit 40 and power section 50 are combined, using the associated wiring technology, in an application-specific integrated circuit 10 (ASIC). In addition, in a particular specific embodiment, integrated circuit 19 may be packaged into a compact, transfer-molded module (System-in-Package), which assures in a cost-effective manner the compactness, the robustness with respect to weather influences and the mechanical effects, the electrical insulation and the removal of heat losses. The combination of the functions named in an integrated component makes possible the cost-effective implementation of the functions in large piece numbers. Integrated circuit 10 is thus able to be provided for the connection of the most varied energy-converting terminals to a power supply network 61, and a data network implemented via power supply network 61.

What is claimed is:

1. A device, comprising:
   an interface configured for coupling to a plurality of energy consuming devices of a plurality of types by releasable connections of the energy consuming devices to the interface;
   a network terminal to connect to an electric power supply network;
   a powerline;
   a communications unit coupled to the network terminal via the powerline to obtain electrical energy from the power supply network and via the network terminal;
   a logic unit; and
   a power section;
   wherein:
      the communications unit is configured to extract control data from the electrical energy obtained from the power supply network and provide the extracted control data to the logic unit;
      the logic unit is configured to control the power section according to the extracted control data received from the communications unit;
      the power section is configured to control, according to the control of the power section by the logic unit, a flow of energy, of the electrical energy from the power supply network from which the control data has been extracted, to the plurality of energy consuming devices;
      the logic unit is configured to process status data regarding the plurality of energy consuming devices to generate output data which the logic unit provides to the communications unit;
      the communications unit is configured to provide the output data from the logic unit to the power supply network via the powerline and the network terminal;
      the communications unit and the power section are connected via at least one powerline, and the logic unit is connected to the communications unit and the power section via at least one data line; and
      the device is a single application-specific integrated circuit (ASIC).

2. The device as recited in claim 1, wherein the status data includes sensor data, the sensor data including information regarding at least one of acceleration, position, temperature, current, and voltage.

3. The device as recited in claim 1, wherein the status data includes sensor data from an external sensor.

4. The device as recited in claim 1, wherein the power section includes at least one of a user actuating module, an on/off switch, and an energy feed module.

5. The device as recited in claim 1, wherein the communications unit has a radio interface.

6. The device as recited in claim 1, wherein the application-specific integrated circuit is a transfer-molded module.

7. The device as recited in claim 1, wherein the power section is further configured to perform its control of the flow of energy additionally based on status data.

8. The device as recited in claim 7, wherein the status data includes at least one of log-in information, sensor data, and an alarm.

9. The device as recited in claim 1, wherein the status data includes at least one of log-in information, sensor data, and an alarm.

10. A device, comprising:
    an interface configured for coupling to (a) a plurality of energy consuming devices of a plurality of types by releasable connections of the energy consuming devices to the interface and (b) an energy generation terminal;
    a network terminal to connect to an electric power supply network;
    a powerline;
    a communications unit coupled to the network terminal via the powerline to obtain electrical energy from the power supply network and via the network terminal;
    a logic unit; and
    a power section;
    wherein:
        the communications unit is configured to extract control data from the electrical energy obtained from the power supply network and provide the extracted control data to the logic unit;
        the logic unit is configured to control the power section according to the extracted control data received from the communications unit;
        the power section is configured to control, according to the control of the power section by the logic unit, a flow of energy, of the electrical energy from the power supply network from which the control data has been extracted, to the plurality of energy consuming devices;
        the logic unit is configured to process status data regarding the plurality of energy consuming devices to generate output data which the logic unit provides to the communications unit;
        the communications unit is configured to provide the output data from the logic unit to the power supply network via the powerline and the network terminal;
        the power section is configured to feed electrical energy, obtained via the interface and from the energy generation terminal, to the power supply network; and
        the device is a single application-specific integrated circuit (ASIC).

11. The device as recited in claim 10, wherein the feed of the electrical energy to the power supply network is via the communications unit, powerline, and network terminal.

12. A method for operating a plurality of energy consuming devices on an electric power supply network, the method being performed by an application-specific integrated circuit (ASIC), the ASIC comprising an interface configured for coupling to the plurality of energy consuming devices of a plurality of types by releasable connections of the plurality of energy consuming devices to the interface, a network terminal connected to the electric power supply network, a communications unit, a logic unit, and a power section, wherein the communications unit is coupled to the network terminal and to the power section via at least one powerline and the logic unit is connected to the communications unit and the power section via at least one data line, the method comprising:
    obtaining electrical energy, by the communications unit, from the electric power supply network, over the power line, and via the network terminal;
    extracting, by the communications unit, control data from the obtained electrical energy;
    providing, by the communications unit and to the logic unit, the extracted control data;
    controlling, by the logic unit, the power section according to the extracted control data received from the communications unit;
    controlling, by the power section and according to the control of the power section by the logic unit, a flow of energy, of the electrical energy from the electric power supply network from which the control data has been extracted, to at least one of the plurality of energy consuming devices;
    processing, by the logic unit, status data regarding the at least one of the plurality of energy consuming devices to generate output data;
    providing, by the logic unit, the generated output data to the communications unit; and
    providing, by the communications unit, the output data from the logic unit to the electric power supply network via the at least one powerline and the network terminal.

* * * * *